Nov. 23, 1965    A. C. KORTE    3,219,272
THERMOSTATIC VALVE
Original Filed Dec. 30, 1960

INVENTOR.
ALFRED C. KORTE
BY
AGENT

United States Patent Office 3,219,272
Patented Nov. 23, 1965

3,219,272
THERMOSTATIC VALVE
Alfred C. Korte, Jennings, Mo., assignor to ACF Industries, Incorporated, New York, N.Y., a corporation of New Jersey
Original application Dec. 30, 1960, Ser. No. 79,768. Divided and this application Dec. 23, 1963, Ser. No. 332,734
2 Claims. (Cl. 236—93)

This application is a division of my copending application Ser. No. 79,768, filed on December 30, 1960.

This invention is directed to a thermostatic valve structure primarily for use in connection with a fuel pump.

The object of this invention is the provision of a temperature sensitive control valve which is capable of opening a passage, such as a fuel passage, at ambient temperatures above a pre-determined value, the valve including a structure permitting adjustment of the thermostat and quick assembly of the parts.

FIG. 1 is a plan view of a fuel pump which has an inlet represented at 15 to which a fuel conduit connects the fuel pump to a source of fuel. The details of the fuel pump are conventional and well known and only those parts of the structure necessary for the understanding of the instant invention will be described.

Figure 1:
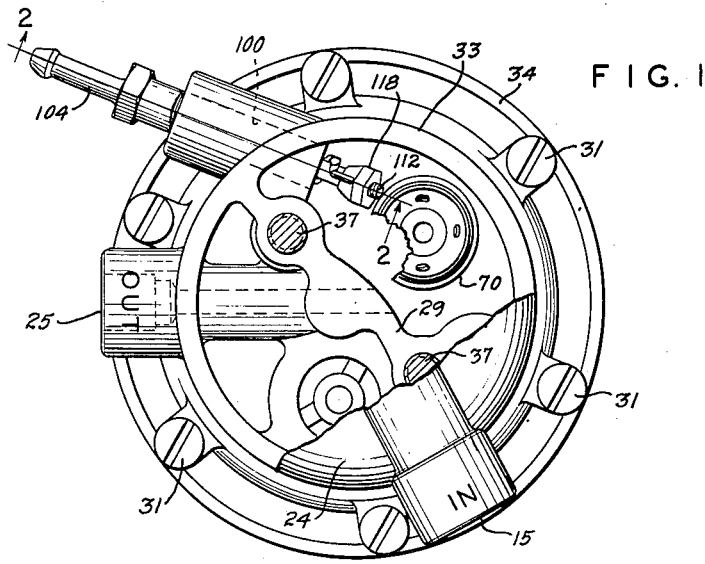
FIG. 1 is a plan view of a fuel pump with a portion of the inlet housing removed.

The fuel pump consists of an inlet housing 24 in which there is formed a valve housing 33 and an outlet chamber 28 (FIG. 2) separated by a transverse wall structure 29. The inlet housing 24 and valve housing 33 are fixed together by screws 37 (FIG. 1) extending upwardly from the valve housing 33 into the inlet housing 24. Flanges 32 (FIG. 2) and 34 are held together by screws 31.

Figure 2:
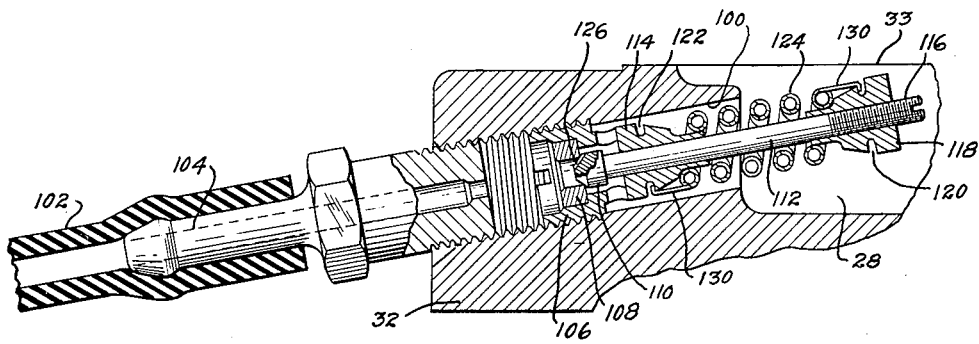
FIG. 2 is an enlarged sectional view of the vapor relief control means in accordance with the invention and taken on line 2—2 of FIG. 1.

The invention is illustrated in use in a pump in FIG. 1 with an enlarged disclosure of the structure shown in FIG. 2 and consists of the outlet passage 100 from the outlet chamber 28 of the pump, which passage 100 may be connected by a suitable conduit line 102 to permit the flow of fuel from the pumping chamber 28.

The passage 100 is fitted with a nipple 104, to which the conduit 102 is attached. Threaded into the outlet passage 100 is a valve seat structure 106 (FIG. 2) into which is fitted a calibrated orifice structure 108 to provide a pre-determined flow of fuel into the conduit 102. The orifice structure 108 is partially closed by a valve device consisting of a valve element 110 formed by an enlarged head of a valve rod 112 slidably mounted in a bearing portion 114 of the valve seat structure 106. Fitted to a threaded end portion 116 of rod 112 is a shaped nut 118 having a peripheral groove 120 extending around its outer surface. The bearing portion 114 of the valve seat structure 106 also is formed with a circumferential groove 122 extending around its outer surface. A thermostatic spring 124 is coaxially mounted on rod 112 between the nut 118 and the bearing portion 114 of the valve seat structure 106. Spring 124 is a double wound helix formed of bimetallic spring material.

Figure 3:
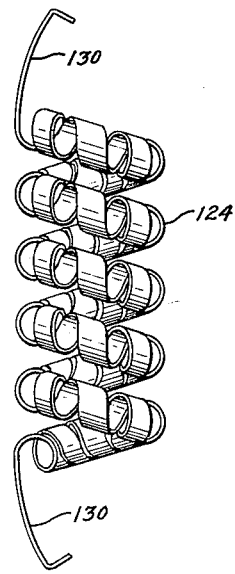
FIG. 3 is an enlarged view of the spring element of the control means of FIG. 2.

FIG. 3 shows spring 124 in an enlarged view. Spring 124 is formed of a thin bimetallic strip which is formed in a long helix and, then in turn, the helix is wound into a coil to form the convolutions of the spring. Each end of the bimetallic strip is formed into a shaped hook structure 130 which is fitted into one of the peripheral grooves 120 and 122, respectively. The valve head 110 is thus biased against a seat formed in the opening of orifice structure 108 by the spring 124 between the fixed bearing element 114 and the nut 118 on rod 112. Adjustment of the nut 118 will provide the desired biasing pressure of the valve head 110 against the valve seat 108. The bimetallic properties of the spring enable it to expand as the temperature of the fuel to which it is exposed in chamber 28 rises. Expansion of the spring 124 releases its biasing force on valve head 110. Further increase in fuel temperature will cause additional expansion of spring 124 to lift valve head 110 away from the valve heat of orifice 108. Valve head 110 has a small groove 126 in its surface to form a constant bleed from chamber 28 into the return fuel conduit 102.

The operation of the device is such that under normal temperatures of the fuel in chamber 28 to which the thermostatic spring 124 is exposed, spring 124 will normally bias the valve head 110 onto the seat or orifice 108 and retain operation of the constant bleed 126 only. Furthermore, the normal operating pressure of fuel in chamber 28 in the order of 5 to 6 pounds per square inch, aids in holding the valve 110 against its seat as well. This constant bleed 126, under normal conditions, has the effect of preventing any build-up of vapor in the outlet chamber 28. As the temperature of the fuel rises in the outlet chamber 28 of the pump, the spring 124 will tend to expand to first relieve its biasing pressure on the valve 110 and then to overcome the pressure in the fluid in chamber 28 tending to hold the valve 110 against its seat. As the valve 110 moves away from its seat, the passage of fuel into the return line 102 is increased and it has been found that the fuel vapor escapes through return line 102 more readily than the solid fuel itself.

The device, thus described, forms a thermostatically controlled relief valve in which the valve is controlled by a thermostatic heat-responsive spring exposed to the ambient temperature in chamber 28. The device is one which provides a large bypass of vapors when it is needed under adverse conditions of high temperature.

The opening of valve 110 will take place at different temperatures in accordance with changes in the pressure of the fuel in the outlet chamber 28. As described above, the fuel pressure with chamber 28 exerts a closing force on the valve 110, which has to be counteracted by expansion of a thermostatic spring 124 to open valve 110. Under adverse conditions of high temperature operation, the presence of vapor in the outlet chamber 28 of the pump causes the pump pressure in chamber 28 to drop. This drop in fuel pressure reduces the closing force of the fuel on valve 110 and permits its opening by spring 124 at a lower temperature.

I claim:

1. A valve structure for connection between the outlet of a fuel pump and a fuel reservoir, said valve structure comprising a valve body having a fuel passage therethrough adapted to be connected at one end to said fuel pump outlet, said valve body having an annular valve seat forming a portion of said fuel passage, a recess formed in the wall of said valve body, a valve rod slidably mounted within said valve body and having a head at one end thereof for closing said fuel passage, a passage between said valve head and valve seat to provide a constant bleed into said fuel passage when said valve is in closed position, a portion of said valve rod at the other end thereof extending outside said valve body, a nut adjustably secured to the outer end of said rod, a recess formed in an outer face of said nut, a temperature sensitive control for opening said fuel passage at ambient temperatures above a predetermined value, said temperature sensitive control including a thermosensitive coil spring outside of said valve body and surrounding said portion of said valve rod, said thermosensitive coil spring including terminal portions defining hooks for engaging the recesses in said valve body and in said nut for connecting the rod end and the valve body for biasing said head onto said seat at ambient temperatures below said predetermined amount.

2. The invention of claim 1 wherein the recesses are in the form of peripheral grooves about the valve body and the nut, whereby the hooked terminals of the thermosensitive coil spring may be connected therewith regardless of the position of the thermosensitive spring about said valve rod.

References Cited by the Examiner
UNITED STATES PATENTS

| | | | |
|---|---|---|---|
| 966,096 | 8/1910 | Holmes | 236—100 |
| 2,121,259 | 6/1938 | Parsons | 73—363.9 |
| 2,145,925 | 2/1939 | Geisel | 236—101 |
| 2,226,200 | 12/1940 | Donnelly | 236—93 X |
| 2,434,393 | 1/1948 | Chace et al. | 236—93 X |
| 2,556,777 | 6/1951 | Reimuller | 236—93 |
| 2,598,351 | 5/1952 | Carter | 236—92 X |
| 2,862,538 | 12/1958 | McNulty | 236—93 X |
| 2,910,243 | 10/1959 | Bowman | 236—101 X |

EDWARD J. MICHAEL, *Primary Examiner.*

ALDEN D. STEWART, *Examiner.*